Jan. 7, 1936.   A. LACK   2,027,179
PISTON
Filed Aug. 18, 1933   2 Sheets-Sheet 1
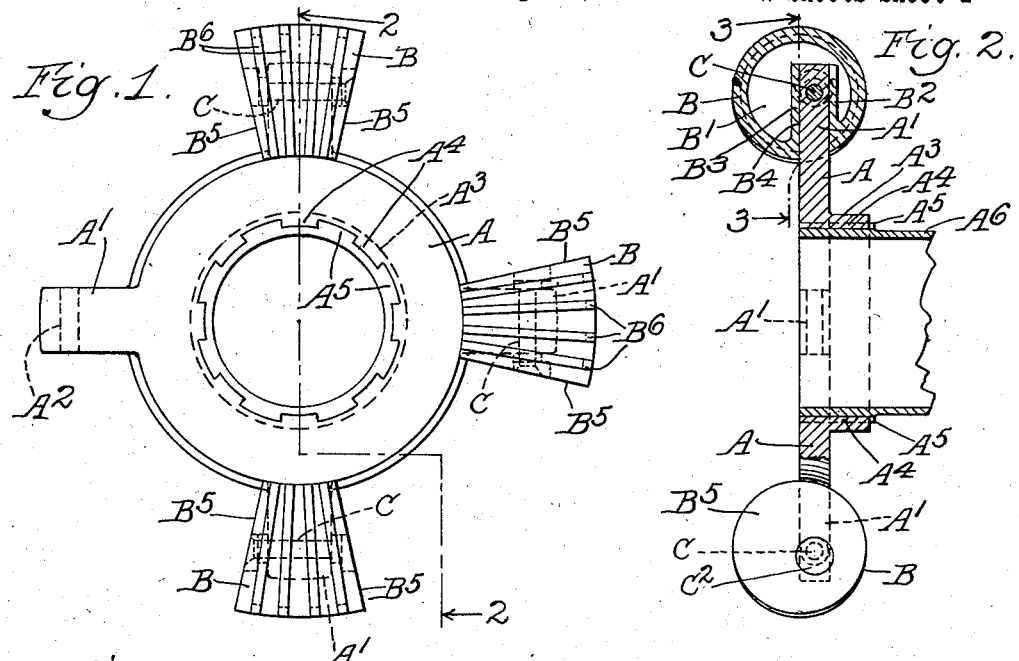
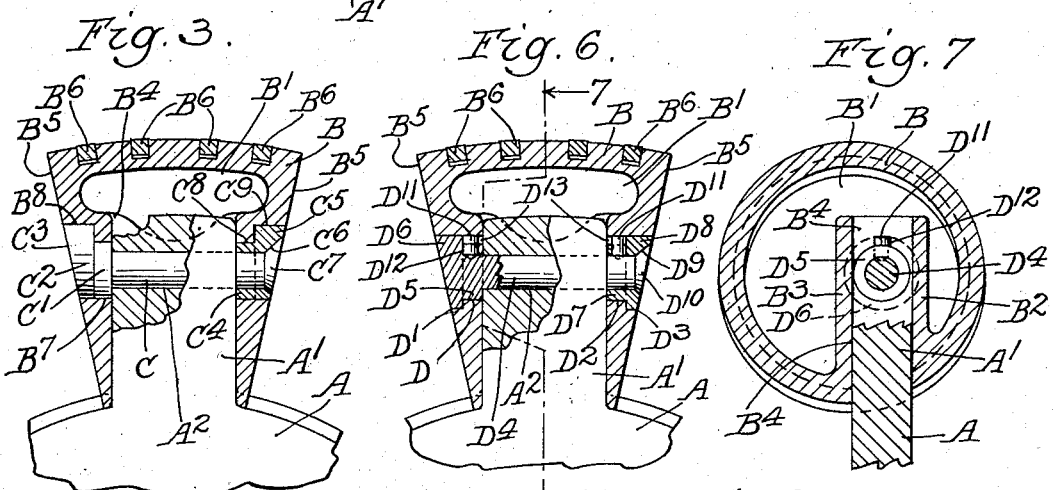
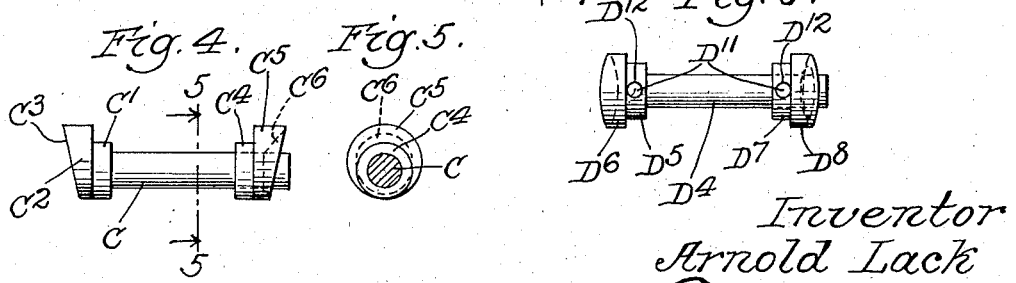
Inventor
Arnold Lack
by Parker + Carter
Attorneys Jan. 7, 1936.  A. LACK  2,027,179
PISTON
Filed Aug. 18, 1933   2 Sheets-Sheet 2
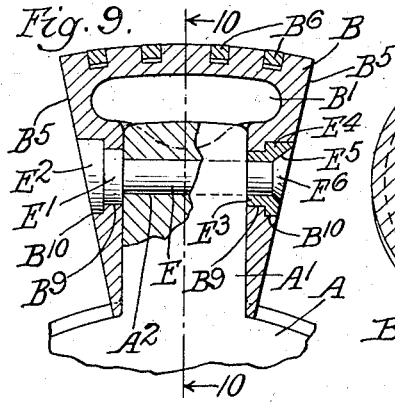
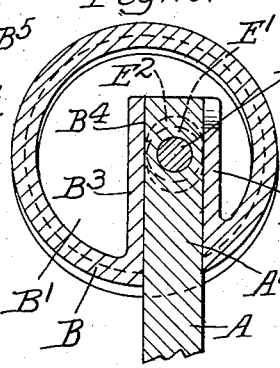
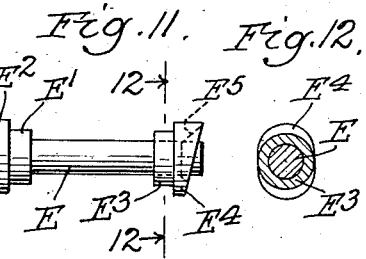
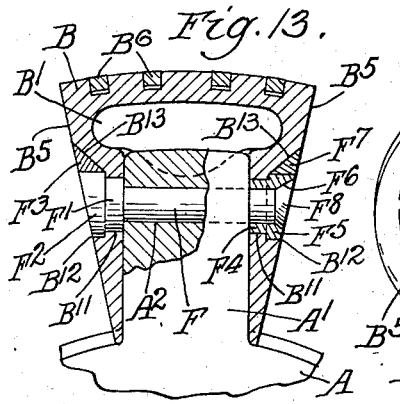
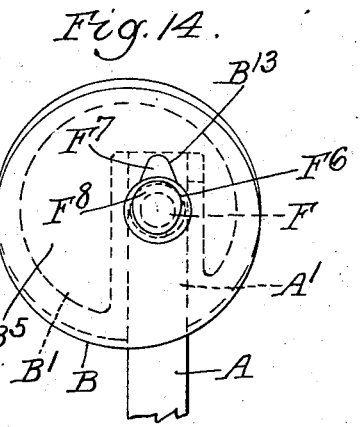
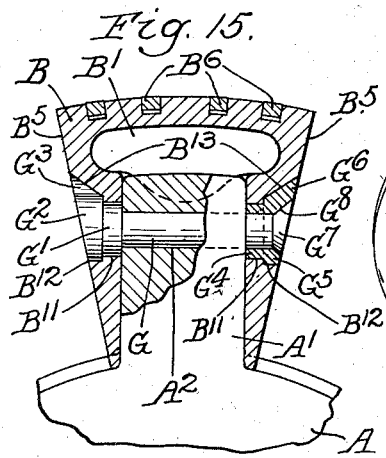
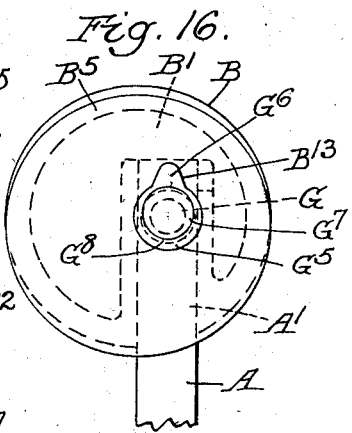
Inventor
Arnold Lack
by Parker + Carter
Attorneys.

Patented Jan. 7, 1936

2,027,179

UNITED STATES PATENT OFFICE 2,027,179

PISTON

Arnold Lack, Chicago, Ill., assignor to H. H. Shockey, Chicago, Ill.

Application August 18, 1933, Serial No. 685,669

2 Claims. (Cl. 121—49)

This invention relates to a piston construction, to a piston carrier and to the method and means of attaching the piston to the carrier.

It has for one object to provide means for attaching pistons to a carrier, whereby the possibility of piston displacement is avoided and whereby the possibility of misalignment and slipping is prevented.

Other objects will appear from time to time in the specification and claims.

The invention is illustrated more or less diagrammatically in the accompanying drawings, wherein—

Figure 1 is an elevation showing a piston carrier in the form of a ring with some pistons in place;

Figure 2 is a cross section taken at line 2—2 of Figure 1, showing the carrier in position upon a sleeve or hollow shaft;

Figure 3 is a cross sectional detail taken at line 3—3 of Figure 2, on an enlarged scale, showing one form of piston attachment;

Figure 4 is a detail in elevation showing the rivet and washer used in Figure 3, before riveting;

Figure 5 is a transverse cross sectional detail taken at line 5—5 of Figure 4;

Figure 6 is a view generally similar to Figure 3, showing a modified form of rivet and attachment;

Figure 7 is a cross sectional detail taken at line 7—7 of Figure 6;

Figure 8 is an elevational view of the rivet and washer of Figures 6 and 7, before riveting;

Figure 9 is a cross sectional detail of a further modification of the rivet and method of attachment;

Figure 10 is a cross sectional view taken at line 10—10 of Figure 9;

Figure 11 is a view of the rivet and washer of Figures 9 and 10, before riveting;

Figure 12 is a transverse cross sectional detail taken at line 12—12 of Figure 11;

Figure 13 is a cross sectional detail showing a further modified means of fastening the rivet, in which welding is used;

Figure 14 is an end elevation of the piston shown in Figure 13;

Figure 15 is a cross section showing a still further modification of the rivet construction;

Figure 16 is an end elevation of the piston shown in Figure 15.

Like parts are indicated by like characters throughout the specification and drawings.

A is a piston carrying ring. It is provided with one or more piston receiving lugs $A^1$ projecting preferably radially from it. Each such lug is provided with a perforation $A^2$ adapted to receive a pin or rivet or other attaching means whereby the piston is fastened to the lug. Toward its inner margin the ring A is provided with a tubular or sleeve-like portion $A^3$ which is splined as at $A^4$ to receive corresponding splines $A^5$ formed on a tubular member $A^6$ which may be a sleeve or hollow shaft to which the piston carrier is attached. The details of this member will not be further described. Neither they nor the means of attaching the piston carrier to the tube form any particular part of the present invention.

In the particular form of the invention shown herewith the piston carrier is arranged to carry pistons which are mounted within a well known toric cylinder and the pistons shown herewith are therefore shaped to move in such a cylinder. The pistons are thus curved along a line concentric with the carrier and are of necessity thickened away from the periphery of the carrier. The various forms of attachment shown herewith might, however, be used with carriers of a different shape and with pistons of different shapes.

B is a piston which may be generally hollowed as at $B^1$ and provided with inwardly extending walls $B^2$, $B^3$ between which there is formed a concavity or socket $B^4$ within which the lug $A^1$ is received. $B^5$, $B^5$ are the faces of the piston and they may be flat or otherwise formed. Each of them is perforated with perforations which, when the piston is in place upon the lug, will be in line with the perforation $A^2$ of the lug. These perforations take somewhat different shapes in the various modified forms shown. The piston is, however, essentially the same in shape in the several forms. Piston rings $B^6$ may be provided and these may be of any suitable form. In the form shown in Figures 3 and 4 there is formed in each of the piston faces $B^5$ a perforation $B^7$ which is provided with an eccentrically placed enlargement $B^8$.

C is a pin having a straight shank portion and an enlarged concentrically placed head $C^1$. Formed preferably integrally with the head $C^1$ is a further enlarged portion $C^2$ which is eccentrically placed with respect to the pin C and the head $C^1$ and provided with the outer inclined face $C^3$. The head $C^1$ lies within the perforation $B^7$ and the head $C^2$ within the portion $B^8$, the outer face $C^3$ of the head $C^2$ forming a continuation of the piston face $B^5$. The opposite end of the shank C receives a washer corresponding in shape to the head $C^1$ of the pin itself. The washer comprises a portion $C^4$ corresponding in shape and location to the head $C^1$ and an eccentrically placed portion $C^5$ corresponding in shape to the head portion $C^2$. As originally formed the portion $C^5$ is hollowed as at $C^6$ to permit the exposed end of the shank to be riveted into it as shown at $C^7$ in Figure 3. To receive the washer the opposite face of the piston is provided with a perforation $C^8$ eccentrically enlarged as at $C^9$ in size and shape corresponding to the perforations $B^7$ and the enlargement $B^8$. As here shown these are of the same size but that is not an essential feature of the invention. Either the head or the washer might be larger than the other.

In Figures 6, 7 and 8 a modified construction is shown. The piston is provided in one face with a perforation D and with a concentric enlargement $D^1$. In its opposite face it has a similar perforation $D^2$ and a concentric enlargement $D^3$. A pin $D^4$ passes through these perforations and through the perforation $A^2$ in the lug $A^1$. It is enlarged as at $D^5$ and further enlarged as at $D^6$. A washer provided with a portion $D^7$ adapted to fit into the perforation $D^2$ and an enlargement $D^8$ to fit into the enlargement $D^3$ is fitted onto the opposite end of the pin $D^4$. It is cut away adjacent its outer end as at $D^9$ to provide a space into which the exposed end of the pin $D^4$ may be riveted as at $D^{10}$. $D^{11}$, $D^{11}$ are pins, each set into a portion $D^{13}$ of the piston B, one extending through the perforation $D^{12}$ and fitting into the head portion $D^5$ of the rivet, the other extending into the washer portion $D^7$. These pins prevent rotation of the pin $D^4$ and of the washer. The head portion $D^5$ of the rivet $D^4$ is perforated as at $D^{12}$ to receive one of the pins $D^{11}$. The portion $D^7$ of the washer is perforated as at $D^{12}$ to receive the other pin $D^{11}$. In the form shown in Figure 6, the piston itself is provided with slots $D^{13}$, $D^{13}$ to receive the pins $D^{11}$. Thus the left hand pin $D^{11}$ which is positioned in the hole $D^{12}$ in the rivet head portion $D^5$ fits into the left hand slot $D^{13}$ while the right hand pin $D^{11}$ which is positioned in the hole $D^{12}$ in the washer $D^8$ fits into the right hand slot $D^{13}$.

In the modification of Figures 9, 10 and 11 the piston is the same as that previously shown. It is perforated as at $B^9$, $B^9$ and each of the perforations $B^9$ communicates with an enlargement $B^{10}$ which forms a pocket to receive the pin head and the washer. As indicated in Figure 10 the shape of the pocket is more or less elliptical so that a washer or pin head received in it will be held against turning. A pin E is used in this form of the invention. It may have a generally rounded head $E^1$ and an elliptical head $E^2$. This latter is inclined as shown in Figures 9 and 11 to conform with the surface of the piston. The outer end of the pin receives a washer which may have a rounded portion $E^3$ and a more or less elliptical portion $E^4$ to be received into the right hand depression or pocket $B^{10}$. The washer is perforated to receive the rivet and the perforation flares outwardly as at $E^5$ as shown in Figures 9 and 11. When the parts are assembled the rivet is riveted as at $E^6$ and then fills the flare $E^5$ and conforms with the surface of the piston.

As shown in Figures 13 and 14 the pin which holds the piston upon the lug is at least partially welded in place. The piston is perforated as at $B^{11}$. $B^{11}$ with preferably round perforations and an enlargement $B^{12}$ communicates with each of the perforations $B^{11}$. The enlargements $B^{12}$ are cut away to provide a notch-like portion $B^{13}$ as shown. A pin F having a head $F^1$ holds the parts in position, the head $F^1$ fitting into the left hand perforation $B^{11}$. The head is enlarged as at $F^2$ to fit into the left hand enlargement $B^{12}$. The head portion $F^2$ is then welded as shown at $F^3$, the weld filling the left hand notch $B^{13}$. The other end of the pin receives a washer having a reduced portion $F^4$ and an enlarged portion $F^5$. The perforation through the washer is outwardly flared as at $F^5$. The washer is welded to the piston, the weld $F^7$ falling within the right hand notch $B^{13}$ as shown in Figure 13. The outer or free end of the pin is riveted into the flared opening $F^6$ as at $F^8$.

In Figures 15 and 16 the perforations through the walls of the piston are the same as those shown and described in connection with Figures 13 and 14. The construction of the pin and the washer is, however, somewhat different. A pin G is provided with a preferably rounded head $G^1$ and an enlarged head $G^2$ which has formed integrally on it a projection $G^3$ extending into the left hand notch or depression $B^{13}$ as shown in Figure 15. A washer $G^4$ is shaped generally similarly to the pin head and is provided with an enlargement $G^5$ which has a projection $G^6$ on it fitting into the right hand notch $B^{13}$ as shown in Figure 15. The outer or free end of the pin is riveted as at $G^7$ to fill the flared portion $G^8$ in the washer. The pin is thus held against turning by the entrance of the members $G^3$ and $G^6$ into the two notches $B^{13}$. The pin head $G^2$ might be modified by the omission of the projection $G^3$ and in that case the pin head would preferably be welded into the piston in the manner shown in Figure 13, the weld taking the place of the projection $G^3$, so that one end of the pin would be welded as shown in Figure 13 and the other end would be held against rotation by the construction shown in Figures 15 and 16.

The use and operation of my invention are as follows:

In attaching the pistons to the carrier in a rotary engine a locking device is necessary to prevent loosening of the pistons. This is particularly important where the movement is such that pistons come very close to each other. Where the clearances between the pistons is very slight even the rotation of the pin might bring its head into position where it would strike another piston. Consequently no matter what the structure or particular details of the rotary engine or the carrier or the pistons, it is important not only that the pistons be held upon the carrier but that the holding or attaching means be held against rotation.

In the form shown the piston force is transmitted from the piston through the lug upon which it is positioned to the carrier and from the carrier, to a shaft or to any other suitable member. Since the pistons are in a rotary engine they are subject to centrifugal force during rotation and this force is taken up by means of the pin which passes through the piston and through the lug. The pin thus keeps the piston in its proper radial position by holding it upon the lug which is fixed to the carrier, being preferably made integrally with it. The sidewise movement of the piston with relation to the lug is prevented by the walls formed within the piston to embrace the lug. The method of attachment of the piston to the lug is normally the same no matter what shape the faces of the piston may be given. In the form shown the pistons have flat faces.

Whichever form of the device is used, the assembly is substantially the same. There is first a piston carrier. Because the carriers are usually assembled in an engine in pairs, the pistons will be off-set upon the carrier as shown for example in Figure 2. Whether or not this method is used there is always a carrier with lugs and the pistons are shaped to fit upon the lugs. The lugs are perforated as are the pistons. A pin is inserted to pass through the piston and through the lug upon which the piston is positioned. The head of the piston fits into a depression or perforation so that it lies preferably flush with the surface of the piston. At its other end the pin projects into the piston and receives a washer. This washer may be welded in place or riveted in place by means of the end of the pin. Whatever the form of the invention, rotation of the pin is prevented, in one case by giving it an off-set head and using a correspondingly off-set washer. In another case by using pins which engage the main pin and the washer and a third case by welding the parts and in a fourth case by providing projections on the washer and on the pin head to prevent rotation. Further variations and combinations of these methods may be used but in any event the result is that the piston is held against movement with respect to the carrier and the carrier lug upon which it fits, and the pin is held against rotation with respect to the piston and with respect to the lug.

I claim:

1. In combination, a circular piston carrier, a lug projecting radially therefrom, a hollow truncated toric piston having an aperture in the wall thereof adapted to be penetrated by the lug, the piston having opposed flat faces radially disposed with respect to the piston carrier, the walls of the lug being generally parallel to the radius of the piston carrier, the interior walls of the piston being parallel and adapted to be contacted by the lug walls, aligned apertures in lug and piston walls, having a central axis parallel to a tangent to the carrier, the apertures in the piston walls increasing in cross sectional area from inside outwardly and being irregular in contour, a holding pin extending through the apertures and enlarged at its ends to completely fill the apertures in the piston wall, the enlarged portions of the pin being substantially flush with the piston faces.

2. In combination, a circular piston carrier, a lug projecting radially therefrom, a hollow truncated toric piston having an aperture in the wall thereof adapted to be penetrated by the lug, the piston having opposed flat faces radially disposed with respect to the piston carrier, the walls of the lug being generally parallel to the radius of the piston carrier, the interior walls of the piston being parallel and adapted to be contacted by the lug walls, aligned apertures in lug and piston walls, having a central axis parallel to a tangent to the carrier, the apertures in the piston walls increasing in cross sectional area from inside outwardly and being irregular in contour, a holding pin extending through the apertures, one end of the pin being enlarged to fill one of the piston wall apertures, a washer member encircling the pin and filling the other piston wall aperture, the pin being riveted to said washer member, both ends of the pin and the washer member being substantially flush with the outer faces of the piston.

ARNOLD LACK.